Dec. 6, 1955     E. H. ANDERSON     2,725,705
LAWNMOWER DRIVES

Filed March 22, 1952     3 Sheets-Sheet 1

Inventor
Einar H. Anderson
by Parker + Carter
Attorneys

Dec. 6, 1955   E. H. ANDERSON   2,725,705
LAWNMOWER DRIVES

Filed March 22, 1952   3 Sheets-Sheet 3

Inventor
Einar H. Anderson
by Parker & Carter
Attorneys

United States Patent Office 2,725,705
Patented Dec. 6, 1955

2,725,705

LAWNMOWER DRIVES

Einar H. Anderson, La Grange Park, Ill.

Application March 22, 1952, Serial No. 277,994

8 Claims. (Cl. 56—26)

The invention relates to an improvement in driving means for lawnmowers, and has for one purpose to provide an improved and simple drive for motor-driven lawnmowers.

Another purpose is to provide an improved drive for the propelling wheels of a motor-driven lawnmower.

Another purpose is to provide an improved drive for the reel of a lawnmower.

Another purpose is to provide an improved relationship between the blades of the reel and the cutter bar.

Another purpose is to provide an improved cutter reel for lawnmowers.

Another purpose is to provide improved means for providing an accurate height of cut and for preventing the bending or blowing of grass by rotation of the reel, with consequent irregularities of cut.

Other purposes will appear from time to time in the course of the specification and claims.

I illustrate my invention more or less diagrammatically in the accompanying drawings wherein:

Figure 4 is a fragmentary detail section, on a somewhat enlarged scale, on the line 4—4 of Figure 2.

Like parts are indicated by like symbols throughout the specification and drawings.

Figure 1:
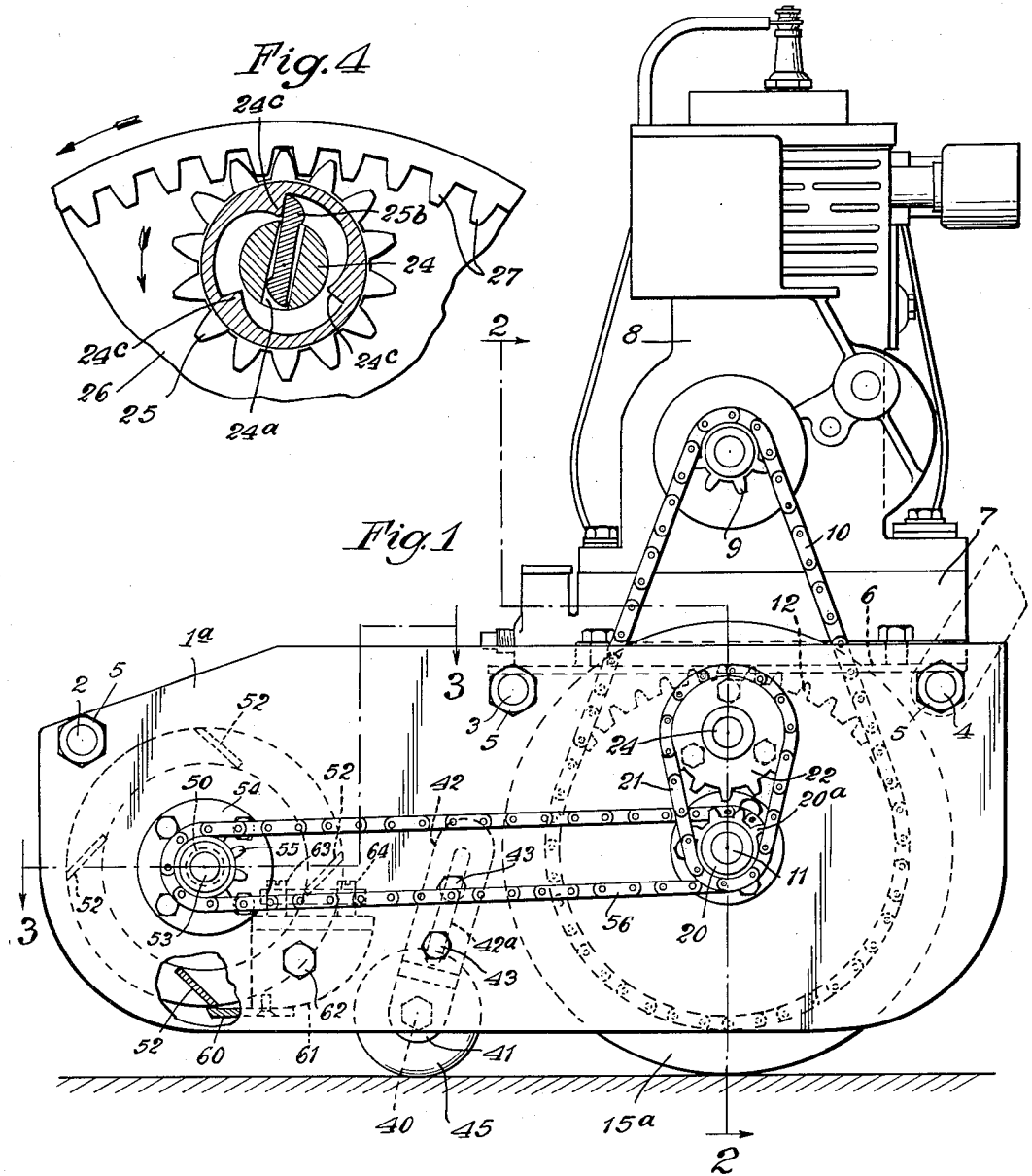
Figure 1 is a side elevation, with parts skeletonized and parts broken away.

Referring to the drawings, 1, 1a illustrate side members or plates which are shown as connected together by a plurality of spacing and securing rods 2, 3 and 4. Each such rod is secured at each end to one of the side members 1 or 1a, and may be secured, for example, by cooperating nuts 5, 5a. Suitably supported on the housing thus formed, and, for example, resting upon or secured to the cross-rods 3 and 4, is a motor assembly which includes a bottom plate 6, a motor base 7, and a motor 8. 9 is any suitable drive pinion, driven by the motor 8, about which passes any suitable driving member, such as a chain 10, which, in turn, passes about a driven sprocket 12 on the rotatable shaft 11. The ends of the shaft 11 extend through any suitable bearing assemblies 13, 13a, suitably secured to the side plates 1 and 1a, respectively. The shaft 11 carries ground-engaging propelling wheels, 14, 14a, shown as carrying any suitable ground-engaging tires 15 and 15a, respectively. It will be understood that, in response to actuation of the motor 8, the shaft 11 is rotated, and the device is thus propelled along the ground.

Figure 2:
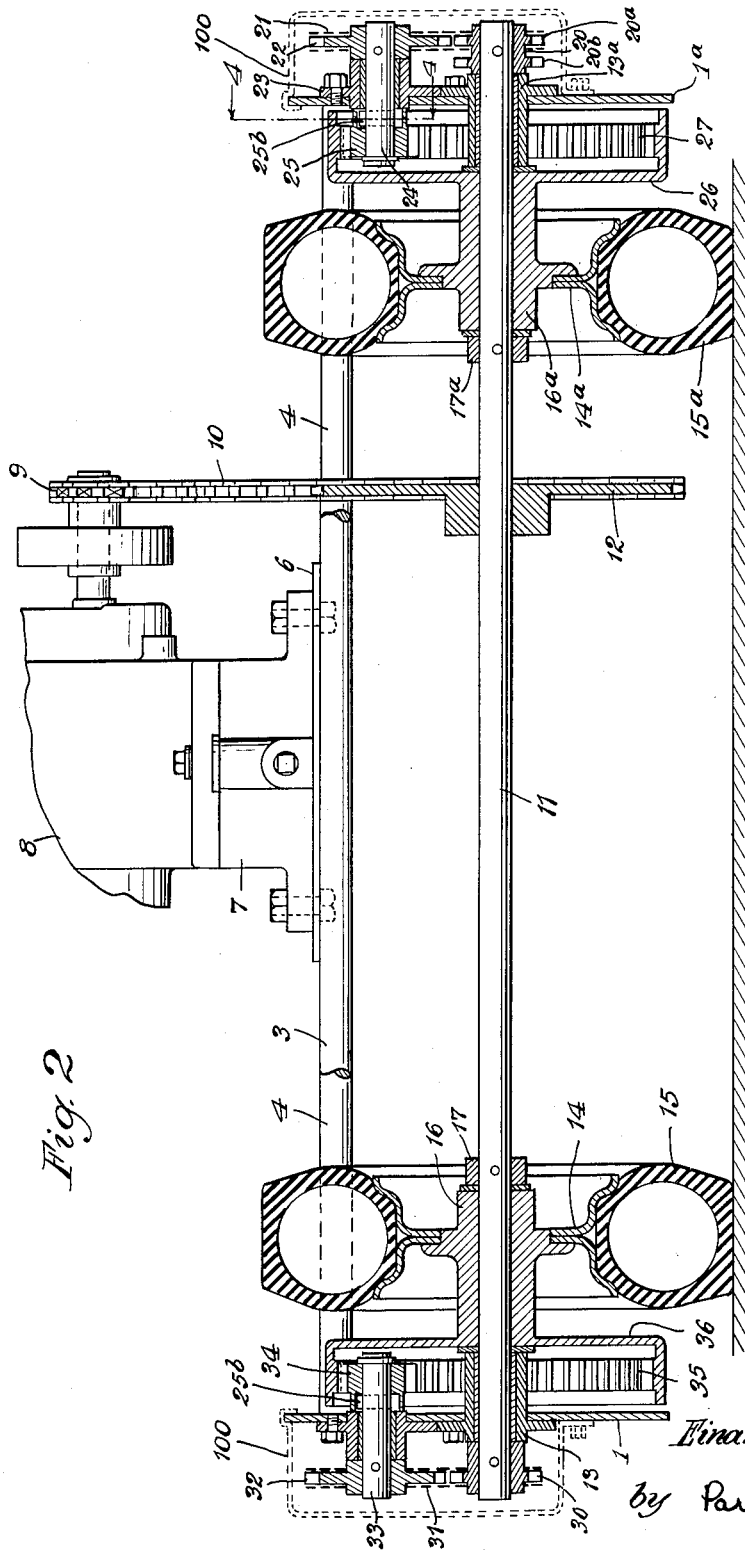
Figure 2 is a section on the line 2—2 of Figure 1.

Preferably, the wheels 14, 14a are free on the shaft 11, and are driven as follows: Each wheel includes a free hub 16 or 16a, held between the collars 17 or 17a and the opposed ends of the bearing assemblies 13 and 13a. Since the shaft 11 is positively driven by the motor, I provide an external driving connection for the free wheels, as follows: Considering the right-hand end of the shaft 11, referring to the position in which the parts are shown in Figure 2, 20 is a double sprocket held against rotation in relation to the shaft 11. About one compartment 20a passes any suitable driving member or chain 21 which passes about the driven sprocket 22 carried in a bearing assembly or sleeve 23, being secured upon a short shaft 24, the opposite end of which, within the side plate 1a, carries a pinion 25 in mesh with an internal gear 27 in a housing 26 which is secured to or forms part of the hub 16a. Thus, one result of the rotation of the shaft 11 is to drive the ground-engaging wheel which is adjacent the inner side of the side plate 1a.

It will be understood that, at the opposite end of the shaft 11, is a single sprocket 30 which similarly drives the opposite wheel through any suitable driving member 31, driven sprocket 32, shaft 33, pinion 34, and internal gear 35 in the housing or cylinder 36 which forms part of or is secured to the hub 16. Thus, as the shaft 11 is rotated it simultaneously drives the two wheels normally in the same direction of rotation. It will be understood that each of the driving assemblies, including the short shafts 24 and 33, respectively, have an overrunning relationship with the driving pinions 25 and 34, respectfully. This is indicated, for example, in Figure 4, which illustrates the shaft 24 and the transverse slot 24a in which is slidably mounted a dog 24b opposed to overrunning teeth 24c formed in the interior of the pinion 25. The overrunning arrangement for the drive for the opposite wheel will be understood to be the same, and the parts are not separately numbered.

Figure 3:
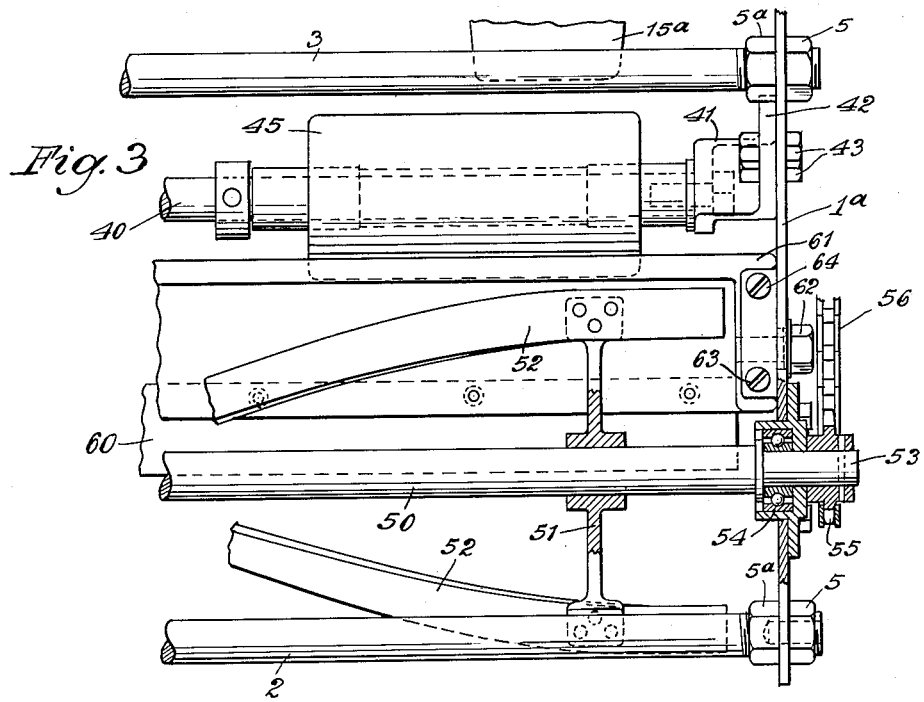
Figure 3 is an enlarged fragmentary section on the line 3—3 of Figure 1.

In order to maintain the side plates, and thus the below-described cutting reel, in proper relationship to the surface over which the lawnmower rides, I illustrate a cross-shaft which may carry one or more ground-engaging rollers. Referring, for example, to Figures 1 and 3, primarily, a shaft 40 is mounted at its ends in any suitable carrying fitting 41. Each such fitting 41 includes an upwardly extending elongated portion 42 with an adjustment slot 42a. Thus the fittings may be adjustably held by any suitable securing means, for example, by bolts 43. It will be understood, of course, that this adjustment may be suitably varied, and that any means may be employed whereby the shaft 40, and, thus, the roller or rollers 45 which it carries, may be suitably adjusted in relation to the side plates 1 and 1a, to maintain the desired relationship between the reel and the surface to be worked on.

Referring, for example, to Figures 1 and 3, I employ a cutter shaft 50 upon which are mounted any suitable spiders 51, which carry cutting blades 52. The shaft 50 has an extension 53 which passes through any suitable bearing assembly 54 in the side plate 1a, and which carries an external sprocket 55 driven by the chain or suitable drive member 56 from the inner component 20b of the double sprocket 20 on the drive shaft 11. It will be understood that when the shaft 11 is driven by the motor 8 the cutter reel is also rotated. It will be understood, of course, in relation to Figure 3, that the opposite end of the cutter shaft 50 is similarly supported by a suitable bearing in the opposite side plate 1.

60 indicates any suitable cutter bar opposed to and cooperating with the edges of the spiral cutter blades 52. It is mounted, for example, on any suitable end adjusting and supporting blocks 61 which are pivotally secured, for example, by bolts 62, and which may be adjusted by spaced set screws 63 and 64. It will be understood that the details of the adjustment do not, of themselves, form part of the present invention, but it will be understood that any suitable means may be employed for suitably adjusting the cutter bar 60 in relation to the cutting edges of the blades 52.

As will be clear, for example, from Figure 1, the blades 52, which may be spiralled, as is usual in the blades of cutter bars, are set at a relatively acute angle. That is to say, they depart sharply from the radial, and constitute, in effect, fan blades which tend to deflect air upwardly away from the grass as they move to cut such grass or other material as extends upwardly against the forward edge of the cutter bar 60. It will be understood that, in the use of my cutter reel, even at high speeds, there is little, if any, tendency to deflect or blow or bend the grass. This, in practice, is an important advantage, since the grass tends to stand erect and to be uniformly cut with a substantially uniform upward extension of the grass from the roots.

Figure 5:
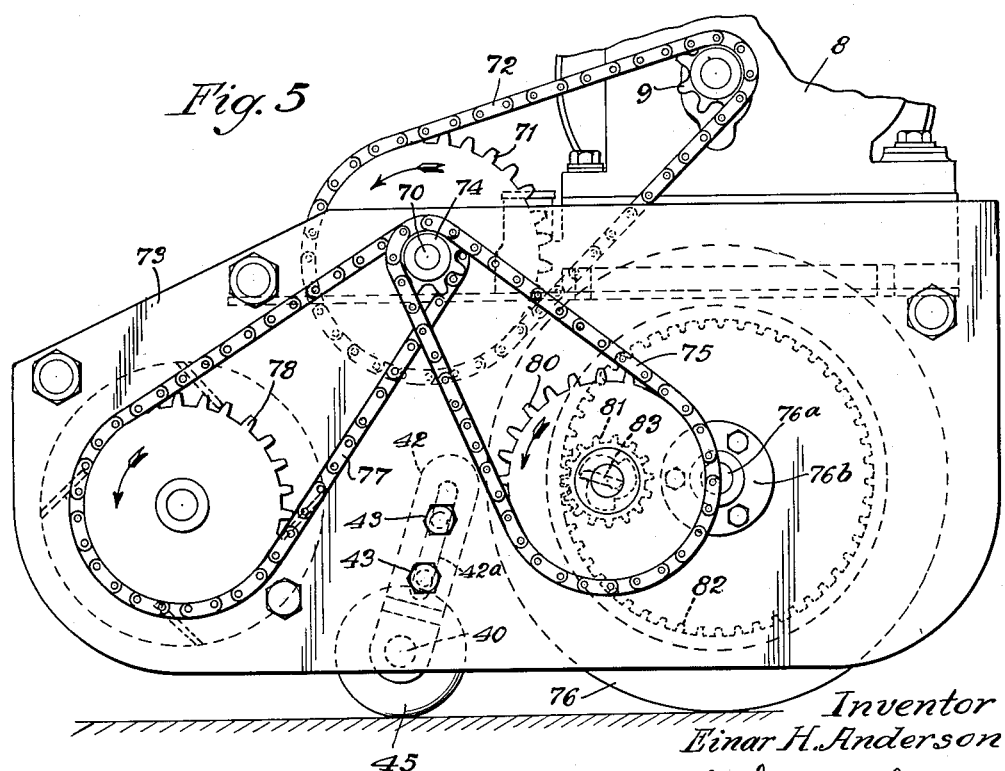
Figure 5 illustrates a variant form of drive, the end of the device being shown in elevation, with parts skeletonized.

In the form of Figure 5, in place of the above described compound drive from the shaft or axle 11, on which the wheels 14 and 14a are mounted, I employ a driven shaft 70 mounted between the side plates, which carries the driven sprocket 71 about which passes any suitable driving member or chain 72 driven from the motor. It will be understood that, corresponding to the showing of Figure 2, the sprocket 71 is located well within the side plates. The shaft 70 extends outwardly beyond the side plate 73 illustrated in Figure 5, and carries a double sprocket 74. About one component of the sprocket passes the driving chain or driving member 75 which actuates a drive for the wheel 76, which is mounted on any suitable shaft 76a in the fixed securing assembly 76b. I find it advantageous to have the shaft fixed to the side plate, with the wheel 76 rotatable on the shaft 76a. The other element of the sprocket 74, through the chain or driving member 77, drives the sprocket 78 which corresponds to the sprocket 55 of Figure 3, and, like it, is exterior to the side plate 73. It will be understood, of course, that I can drive from inside the side plates, but I find it advantageous to have the drive, at least for the cutter reel, exterior to the side plates, so that the entire space between the side plates is available for the movement of the blades of the cutter reel.

It is thought not to be necessary to describe in detail the driving connection for the wheel 76. I illustrate, however, an exterior sprocket 80 and an interior pinion 81, suitably connected thereto, but located within the side plate 73. The pinion 81 is in mesh with the internal gear 82 of the wheel 76. 83 generally indicates an overrunning connection similar to that shown in Figure 4.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I illustrate a simple, compact drive for lawnmowers, which is designed and positioned to permit a maximum length of cutter reel in relation to the frame. Thus the cutter reel can extend throughout substantially the entire distance between the opposed inner surfaces of the end or side plates. The drive for the individual wheels, as shown, for example, in Figure 2, is advantageously positioned exterior to the side plates. For example, it may be shielded by any suitable readily removable shields or housing members 100 illustrated in dotted line in Figure 2. These side housings can easily be removed, and access can be had to the drive. However, they do not extend outwardly far enough from the side plates to be in the way.

An advantageous feature of my invention is the employment of the above described cutter reel in which the angle of the blades 52 prevents blowing over or bending of the grass at the cutting instant.

As regards the tilting of the blades at an angle of, for example, 45 degrees to the radial, a double result is obtained. The pitch of the blades tend to create a suction or movement of the air toward the axis of the reel. But, in addition, with the blades inclined at, say, 45 degrees, there is a tendency of the grass to kink around the blade, and, with some types of grass, to be cut without the necessity of a cutter bar. While a cutter bar is shown, it should be kept in mind that, under some circumstances, the cutter bar may be omitted, and the reel, with the inclined blades, used without the bar.

I claim:

1. In a lawnmower structure, a chassis including side plates and a connecting transverse structure, a motor mounted on said transverse structure, a driving shaft rotatably mounted on and extending between the side plates, a drive member mounted on and for movement in unison with said shaft, a driving connection between the motor and said drive member, said shaft having end sprockets exterior to said side plates, ground-engaging and mower propelling wheels positioned within said side plates and rotatably mounted in relation thereto, and a driving connection between each end of said shaft and one of said ground-engaging wheels, including a flexible driving connection exterior to one of said side plates, the ground-engaging wheels being mounted about and freely rotatable in relation to the driving shaft.

2. In a lawnmower structure, a chassis including side plates and a connecting transverse structure, a motor mounted on said transverse structure, a driving shaft rotatably mounted on and extending between the side plates, a drive member mounted on and for movement in unison with said shaft, a driving connection between the motor and said drive member, said shaft having end sprockets exterior to said side plates, ground-engaging and mower propelling wheels positioned within said side plates and rotatably mounted in relation thereto, and a driving connection between each end of said shaft and one of said ground-engaging wheels, including a flexible driving connection exterior to one of said side plates, the ground-engaging wheels being mounted about and freely rotatable in relation to the driving shaft, and the flexible driving connection including shafts rotatably mounted in the side plates for rotation about axes parallel to the axis of the driving shaft, the outer end of each said shaft having a driving connection with the adjacent outer end of the driving shaft, the inner end of each said shaft having a driving connection with one of the ground-engaging wheels.

3. In a lawnmower structure, a chassis including side plates and a connecting transverse structure, a motor mounted on said transverse structure, a driving shaft rotatably mounted on and extending between the side plates, a drive member mounted on and for movement in unison with said shaft, a driving connection between the motor and said drive member, said shaft having end sprockets exterior to said side plates, ground-engaging and mower propelling wheels positioned within said side plates and rotatably mounted in relation thereto, and a driving connection between each end of said shaft and one of said ground-engaging wheels, including a flexible driving connection exterior to one of said side plates, the ground-engaging wheels being mounted about and freely rotatable in relation to the driving shaft, and the ground-engaging wheels being located between the side plates, each such wheel having an internal ring gear, the flexible driving connection for each ground-engaging wheel including a short shaft rotatably mounted in one of the side plates for rotation about an axis parallel to the axis of the driving shaft, the outer end of each such shaft having a sprocket exterior to the side plate, and a flexible driving connection extending between said sprocket and the adjacent end of the driving shaft, the inner end of each such shaft having a pinion in mesh with the ring gear of the adjacent ground-engaging wheel.

4. In a lawnmower structure, a chassis including side plates and a connecting transverse structure, a motor mounted on said transverse structure, a driving shaft rotatably mounted on and extending between the side plates and having an end extending outwardly beyond one of the side plates, and a double pinion sprocket on said outwardly extending end, a driving connection between the motor and the driving shaft, a cutter reel rotatably mounted between the side plates, and a sprocket therefor positioned exteriorly to a side plate, a flexible driving connection between said sprocket and the double sprocket on the driving shaft, a ground-engaging wheel positioned between the side plates and rotatably mounted thereon, and a driving connection for said wheel including a sprocket exterior to one of the side plates, a flexible driving member connecting said sprocket with the double sprocket on the driving shaft, a pinion unitarily movable with the sprocket, and a gear associated with said wheel, the pinion being in mesh with said gear.

5. In a lawnmower structure, a chassis including generally upright, longitudinally extending side plates, the lower edges of which terminate adjacent but above the surface upon which the structure is supported, a transverse structure connecting the upper edges of said plates, a motor mounted on said transverse structure, a shaft rotatably mounted on and extending between the side plates, a drive member mounted on and for movement in unison with said shaft, a driving connection between the motor and said drive member, ground engaging lawnmower propelling wheels positioned on said side plates and rotatably mounted in relation thereto, a driving connection between said shaft and each of the ground engaging wheels, each such connection including a driven shaft, eccentric to said first mentioned shaft, extending through a side plate, a gear and pinion connection between each said driven shaft and one of the ground engaging wheels, the gear of said connection betwen constituted by an internal ring gear fixed on said ground engaging wheel, and a driving connection between each driven shaft and the first mentioned shaft.

6. The structure of claim 5, characterized in that the ground engaging wheels surround and are rotatable about and in relation to the first mentioned shaft.

7. The structure of claim 5, characterized by and including a cutter reel rotatably mounted on and positioned between the side plates, said reel having a drive member at one end thereof located exteriorly to one of the side plates, and a flexible driving connection between said member and the adjacent end of the first mentioned shaft.

8. The structure of claim 5, characterized in that the driving connections between the driven shaft and the first mentioned shaft are located exteriorly of the side plates.

References Cited in the file of this patent
UNITED STATES PATENTS

| | | |
|---|---|---|
| 707,304 | Coldwell | Aug. 19, 1902 |
| 980,072 | Cramer | Dec. 27, 1910 |
| 1,372,339 | Cook | Mar. 22, 1921 |
| 1,672,250 | Felton | June 5, 1928 |
| 1,674,847 | Watson | June 26, 1928 |
| 1,817,873 | Bready | Aug. 4, 1931 |
| 1,819,133 | Stegeman et al. | Aug. 18, 1931 |
| 2,453,819 | Smith | Nov. 16, 1948 |
| 2,460,111 | Worthington | Jan. 25, 1949 |
| 2,471,975 | Packwood | May 31, 1949 |
| 2,486,969 | Nelson | Nov. 1, 1949 |
| 2,519,019 | Blydenburgh | Aug. 15, 1950 |
| 2,555,881 | Grangroth et al. | June 5, 1951 |